United States Patent [19]

MacInnis et al.

[11] 4,288,413
[45] Sep. 8, 1981

[54] SEPARATING MOLYBDENUM VALUES FROM AN AQUEOUS SOLUTION CONTAINING TUNGSTEN BY SOLVENT EXTRACTION

[75] Inventors: Martin B. MacInnis; Tai K. Kim, both of Towanda, Pa.

[73] Assignee: GTE Products Corporation, Stamford, Conn.

[21] Appl. No.: 158,967

[22] Filed: Jun. 12, 1980

Related U.S. Application Data

[63] Continuation of Ser. No. 38,969, May 14, 1979, abandoned, which is a continuation-in-part of Ser. No. 952,425, Oct. 18, 1978, abandoned.

[51] Int. Cl.³ .............................................. C01G 41/00
[52] U.S. Cl. ................................. 423/54; 75/101 BE; 423/DIG. 14
[58] Field of Search .............. 423/54, DIG. 14, 658.5; 75/101 BE

[56] References Cited

U.S. PATENT DOCUMENTS

| | | | |
|---|---|---|---|
| 3,158,438 | 11/1964 | Kurtak | 423/54 |
| 3,804,941 | 4/1974 | Coad et al. | 423/54 |
| 3,806,580 | 4/1974 | Bradford et al. | 423/54 |
| 4,115,513 | 9/1978 | Kulkami et al. | 423/54 |

FOREIGN PATENT DOCUMENTS

| | | | |
|---|---|---|---|
| 907465 | 10/1962 | United Kingdom | 423/54 |
| 456790 | 2/1975 | U.S.S.R. | 423/54 |

*Primary Examiner*—Herbert T. Carter
*Attorney, Agent, or Firm*—Robert E. Walter

[57] ABSTRACT

The process is described wherein molybdenum values are separated from an aqueous solution containing tungsten. The molybdenum is converted to a thiomolybdate ion and the resulting solution is contacted with a suitable amount of organic extractant for a sufficient period of time to preferentially extract the thiomolybdate. The organic extractant including the thiomolybdate is separated from the aqueous solution comprising the unextracted tungsten values. The molybdenum values are stripped from the separated organic extractant by contacting with an aqueous solution containing sufficient amount of an oxidizing agent suitable for oxidizing the thiomolybdate complex ion to the molybdate ion which in turn is soluble in the aqueous solution. The organic extractant is then recycled for extracting the thiomolybdate complex ion and the molybdate ion may be recovered from the aqueous solution by conventional methods.

1 Claim, 1 Drawing Figure

SEPARATING MOLYBDENUM VALUES FROM AN AQUEOUS SOLUTION CONTAINING TUNGSTEN BY SOLVENT EXTRACTION

This is a continuation of application Ser. No. 38,969 filed May 14, 1979, now abandoned, which is a continuation-in-part of Ser. No. 952,425, filed Oct. 18, 1978, now abandoned.

This invention relates to a process for separating molybdenum values from an aqueous solution containing tungsten values and molybdenum values.

According to prior art methods and as described in U.S. Pat. No. 3,158,438 to Kurtak, molybdenum is separated from tungsten by treating a solution derived from the treatment of a scheelite ores. Conventional treatment of the scheelite ore results in the formation of a solution containing sodium tungstate and sodium molybdate. According to the above mentioned patent, an alkali metal sulfide is added to the above solution to result in the formation of the thiomolybdate complex ion. By acidifying the basic solution containing the thiomolybdate complex ion, molybdate trisulfide precipitates giving a resulting filtrate essentially free of molybdenum.

U.S. Pat. No. 3,804,941 to Coad et al. relates to a solvent extraction process for the recovery of tungsten. The solution containing tungsten values is sulfidized to convert all of the tungsten to the thiotungstate species. A resulting sulfidized alkaline solution is contacted with an extractant in an organic diluent to extract the tungsten. The amount of extractant employed is disclosed as being from about 1 to 15 percent by weight based on the organic phase with quaternary ammonium chloride being a preferred group of extractants. The extraction process as described is effective for removing relatively low concentrations of tungsten present as the tungstate ion from a brine not disclosed as containing molybdenum values.

U.S. Pat. No. 3,806,590 discloses a process wherein tungsten in an alkaline solution is sulfidized to convert it to a thiotungstate species, contacted with an organic phase comprising an extractant in an organic diluent whereby the thiotungstate is extracted into the organic phase and subsequently recovered. The improvement comprises contacting the thiotungstate containing organic phase with sulfur dioxide whereby at least a portion of the thiotungstate is converted to a tungstate species. The tungstate species is stripped from the organic phase with an aqueous salt solution to recover the tungstate. The starting tungsten solution has a relatively low concentration of tungsten and is not disclosed as containing molybdenum values as well as tungsten.

A problem with the above method of separating molybdenum and tungsten is the resulting production of a sludge containing high quantities of molybdenum and sulfur.

SUMMARY OF THE INVENTION

It is an object of the present invention to provide a improved process for the extraction recovery of molybdenum from a solution containing molybdenum and tungsten.

It is a further object of this invention to provide a process wherein the molybdenum can be separated by an extraction process and the extractant can be stripped of molybdenum for recycling.

Other and further objects of the further invention will become apparent from reading the following description.

In accordance with the principles of the present invention, there is provided a process for removing molybdenum values from an aqueous solution containing tungsten values comprising (a) sulfidizing said solution to an extent sufficient to convert substantially all of the molybdenum values to a thiomolybdate species, said sulfidizing being substantially less than the extent necessary to convert substantially all of said tungsten values to a thiotungstate species, (b) contacting the resulting solution containing the molybdate complex ion with a suitable amount of organic extractant for a sufficient period of time to preferentially extract the thiomolybdate into the organic extractant, said organic extractant comprising an aromatic organic solvent and a quaternary ammonium compound of the formula $[R_3(CH_3)N]^+A^-$ wherein R is an alkyl group having about 8 to 10 carbon atoms and A is an anion derived from a mineral acid, (c) separating the organic extractant containing the thiomolybdate complex from the aqueous solution containing tungsten values, (d) stripping the molybdenum values from the separate organic extractant by contacting said extractant with an aqueous solution containing a sufficient amount of an oxidizing agent suitable for oxidizing said thiomolybdate complex to a molybdate ion, and (e) recycling said extractant solution to step b to extract further molybdenum values.

DESCRIPTION OF THE DRAWING

The drawing is a flow sheet of one embodiment of the present invention.

DETAILED DESCRIPTION

Figure 1:
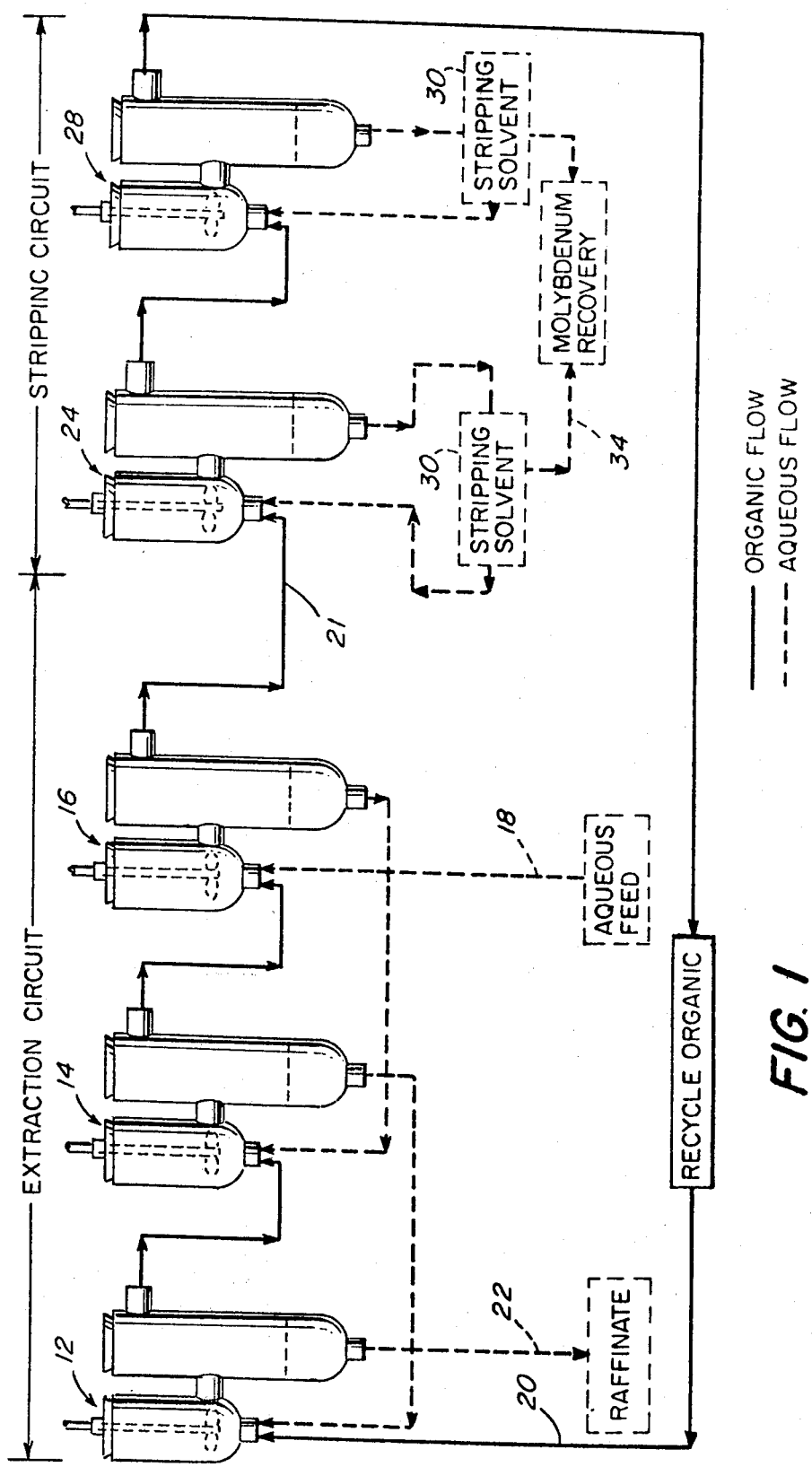

The starting aqueous solution from which it is desired to concentrate the tungsten values and remove impurities includes molybdenum values. The solution may be formed from the ores scheelite or wolframite including ferberite and hubnerite or a concentrate thereof. The ore is ground and digested, such as with an alkaline solution, for a period of time sufficient to dissolve both molybdenum and tungsten. Typical prior art leaching methods employ sodium carbonate to leach out the tungsten values. The digestion of scheelite with soda is preferably conducted at an elevated temperature, say about 130° C. for a period of time sufficient to digest the tungsten and molybdenum to form a solution containing sodium molybdate and sodium tungstate and an insoluble residue. The leach liquid typically has a pH in excess of 8 and comprises less than about 5 grams per liter of sodium molybdate and from about 50 to about 200 grams per liter of sodium tungstate. Minor amounts of various other contaminants are present in the liquor. The present invention is primarily concerned with removing relatively dilute molybdenum values from an aqueous solution containing relatively concentrated tungsten values.

The solution is sulfidized by adding sufficient alkali metal sulfide to the leach liquor to result in converting substantially all of the molybdenum values which are in the form of the molybdate ion to a thiomolybdate species. Preferably at least 200 percent of the amount of alkali metal sufide stoichiometrically required to convert the molybdate ion to a thiomolybdate ion complex having the formula $MoS_4=$ is added. More preferably alkali metal sulfide is added in excess of about five times or 500 percent the stoichiometric amount. Excesses of greater than 10 times can be used. Included within the term alkali metal sulfide are sodium sulfide, sodium acid sulfide. Hydrogen sulfide may also be used.

Sulfidizing should be carried out to an extent substantially less than the extent necessary to convert substantially all of the tungstate to a thiotungstate species. Preferably less than about 300 percent of the stoichiometric amount of alkali metal sulfide required to convert the tungstate ion to a thiotungstate ion having the formula $WS_4^=$ is added. More preferably alkali metal sulfide is added in an amount less than the stoichometric amount.

It is desirable to maximize the concentration of the thiomolybdate species and minimize the concentration of the thiotungstate species in the resulting solution since both species are extractable by the extractant utilized according to the present invention at a subsequent step.

As hereinbefore discussed the present invention is particularly effective when extracting molybdenum values from starting solutions having relatively dilute molybdenum values and containing relatively concentrated tungsten values. When tungsten is present in the starting solution as tungstate ions and molybdenum is present as molybdate ions, the molar ratio of tungstate to molybdate present in solution is preferably greater than about 25 to 1. More preferably the molar ratio of tungstate to molybdate is greater than about 40 to 1.

To effectively convert the molybdate ion ($M_oO_4=$) to the thiomolybdate complex ion which is represented by the formula $MoS_4=$, the pH of the leach liquid should be greater than eight. The resulting solution containing the added alkali metal sulfide preferably has a pH of from about 8.0 to about 9.5 to obtain good extraction. The resulting solution more preferably has a pH from about 8.4 to about 8.6. The use of pH's greater than 10 result in a poor subsequent extraction. The use of lower pH's, on the order of 7.5, result in the formation of an undesirable emulsion.

Generally it is preferred to add the alkali metal sulfide to the leach liquor prior to making a pH adjustment. Satisfactory results may be achieved if the pH adjustment is made prior to the addition of alkali metal sulfide.

The resulting solution containing the thiomolybdate complex ion is contacted with a suitable amount of organic extractant for a sufficient period of time to preferentially extract the thiomolybdate complex ion into the organic extractant. The organic extractant comprises an aromatic organic solvent and an active extractant comprising a quarternary ammonium compound of the formula $[R_3(CH_3)N]^+A^-$, in which R is an alkyl group of from about 8 to about 10 carbon atoms and A is an anion, derived from mineral acids.

Particularly useful as an active extractant is tricaprylyl monomethyl ammonium chloride. Tricaprylyl monomethyl ammonium chloride is sold by General Mills Corporation under the name Aliquat 336. A in the foregoing formula is typically an anion derived from a mineral acid.

The method for extracting molybdenum values by the above method is described in detail in our copending application. U.S. Ser. No. 158,670, entitled Method for Removing Molybdenum From Tungstate Solutions.

The organic solvent is preferably a mixture of alkyl benzenes having molecular weights of either 120, 134 or 140. Typical constituents include trimethyl benzene, ethyl benzene, dimethylethyl benzenes, methyl propyl benzene, tetramethyl benzene, diethyl toluene, dimethylisopropyl benzene, and the like. The material is sold under the tradename SC #150 by Buffalo Solvents and Chemical Corporation. In the 1972 edition of *Organic Solvents*, a trade publication of Buffalo Solvents and Chemical Corporation, SC #150 is listed as having a boiling point range of from 183° C. to 210° C., a Flash Point of 151° F. and specific gravity of 0.902. As previously stated the molecular weight of the alkyl benzenes contained in SC #150 are 120, 134 and 140. Thus the total carbon atoms in the alkyl chains attached to the benzene ring are either 3, 4 or 5.

When the organic solvent comprises a mixture of alkyl benzenes and the active extractant is a quaternary ammonium compound as hereinbefore discussed, the molybdenum values as compared to the tungsten values in the sulfidized solution are preferentially extracted. As the volume percent of active extractant is decreased based on a given total extractant volume, active extractant plus organic solvent, the amount of molybdenum and tungsten values extracted as a percentage of these species present in the sulfidized solution decreases.

Preferably an amount of active extractant as a volume percent of total extractant is utilized to result in greater than about 90 percent of the molybdenum values and less than about 5 percent of the tungsten values present in the sulfidized solution being extracted. Based on total volume of extractant, it is preferable to use less than about 3% by volume active extractant to extract a high percentage of molybdenum values and a low percentage of tungsten values from the sulfidized solution. To reduce the tungsten values extracted, it is more preferred to use less than 2% and more preferred to use less than 1% by volume active extractant.

If it is desirable to extract substantially all of the molybdenum values it may be desirable to use greater than about 3% by volume active extractant. Generally the use of active extractant volumes in excess of 5% results in greater than 99% removal of molybdenum values accompanied by the removal of greater than about 10% of the tungsten values. The ratio of organic extractant to aqueous solution being extracted can be varied within practical limits. Generally the organic extractant to aqueous solution volume ratio can vary from about 1 to 10 to about 10 to 1.

The organic extractant containing the thiomolybdate complex is separated from the aqueous solution containing tungsten values by permitting a phase separation due to the differences in densities between the aqueous and organic liquids. The aqueous solution containing tungsten is further processed in a conventional manner to recover sodium tungstate from the solution which can be by evaporation to produce crystalline sodium tungstate or treated with calcium to precipitate calcium tungstate therefrom.

The organic phase comprising the organic extractant which includes molybdenum values in the form of the thiomolybdate complex ion is contacted with an aqueous solution containing a sufficient amount of oxidizing agent to oxidize the thiomolybdate complex to the molybdate ion. The molybdenum values are transferred from the organic extractant to the aqueous phase in the form of the molybdate ion. Typical oxidizing agents are nitric acid, hydrogen peroxide, and metallic salt of hypochlorous acid. Preferably an aqueous hypochlorite salt solution is utilized. The pH of the hypochlorite solution is preferably from about 10 to about 13.

The organic extractant with the molybdenum values removed is then recycled for contacting with the solution containing the thiomolybdate complex ion.

With reference to the drawing, the extraction circuit 10 consists of three units, 12, 14 and 16 connected in series. The aqueous feed stream containing about 184 grams of tungstate per liter and 1.7 grams of molybdate per liter enters unit 16 while the organic extractant 20 enters unit 12 providing counter current flow. The organic extractant comprises about 2.3 percent by volume Aliquat 336 and 97.7 percent by volume SC #150. The raffinate 22 comprises an aqueous solution containing tungsten values exits from unit 12. The organic extractant containing molybdenum values at 21 exits from unit 16 and enters the stripping circuit comprised of generally of at least two units illustrated in the drawings as units 24 and 28. The aqueous stripping solution containing oxidizing agent 30 enters units 24 and 26 and the stripped organic extractant 32 exits from 28 and is recycled. The stripping solution comprises sodium hypochlorite solution of about 5 percent by weight which is at a pH of 12.5. A pH adjustment is made by adding sodium hydroxide solution. The product stream 34 is sent to a recovery system for recovering the molybdenum values by conventional methods.

The above process is carried out on a small scale wherein the aqueous feed, recycled organic and the flow of make-up stripping solution into the stripping circuit is at the rate of about one milliliter per minute. For each of the units 12, 14, 16, 24, and 28, the mixing section holds about 50 milliliters and the settling section holds about 150 milliliters of liquid.

In a manner similar to the above, the small scale process is carried out by using a molybdenum and tungsten solution containing 163.2 grams per liter $WO_3$ and 440 milligrams per liter molybdenum. The feed mixture is prepared by mixing 98.6 parts by volume of the above tungsten and molybdenum solution with 1.4 parts by volume of a concentrated commercially available NaSH solution. The flow rates for the aqueous feed, the recycled organic and the stripping solution are as above described. The pH of the stripping solution is adjusted to about 12.5 in accordance with the above procedure.

In the extraction circuit, the extractant comprises 1.25 parts by volume Adogen 464, a tricapylyl monomethyl ammonium chloride available from Ashland Oil Company with the remaining parts by volume comprising a high aromatic naptha organic solvent obtained from Buffalo Solvents and Chemical Corporation. In the stripping circuit, a stripping solution comprises 30% by weight sodium hypochloride. During continuous operation and after steady state conditions are achieved, the molybdenum and tungsten concentrations in the raffinate and combined streams from the stripping sections 24 and 28 are analyzed. The raffinate contained 157.2 grams of $WO_3$ per liter and 24 milligrams of molybdenum per liter. The stream representing molybdenum recovery on the drawing contained about 0.34 grams of $WO_3$ per liter and about 475 milligrams of molybdenum per liter.

While there has been shown and described what are considered preferred embodiments of the present invention, it will be obvious to those skilled in the art that various changes and modifications may be made therein without departing from the scope of the invention as described in the appended claims.

We claim:

1. A process for separating molybdenum values from an aqueous solution containing molybdenum and tungsten values comprising the following steps:
  (a) forming an aqueous solution comprising less than about five grams per liter sodium molybdate and from about fifty to about two hundred grams per liter sodium tungstate;
  (b) sulfidizing said aqueous solution to form a sulfidized solution, said sulfidizing being carried out to an extent sufficient to convert substantially all of the sodium molybdate to sodium thiomolybdenum species, said sulfidizing being substantially less than the extent necessary to convert substantially all of said sodium tungstate to sodium thiotungsten species;
  (c) contacting said sulfidized aqueous solution at a pH of from about eight to about nine and one-half with a suitable amount of organic extractant for a sufficient period of time to preferentially extract greater than ninety percent of the sodium thiomolybdenum species into the organic extractant, said organic extractant consisting essentially of tricaprylyl monomethyl ammonium chloride as the active extractant and the balance being an organic solvent comprising a mixture of alkyl benzenes having total carbon atoms in the alkyl group of from three to five, said active extractant being present as a volume percent of total organic extractant in an amount less than about three percent by volume wherein said volume percent is selected to result in greater than ninety percent of the sodium thiomolybdenum species and less than about five percent of the sodium thiotungsten species present in said solution being extracted,
  (d) separating the organic extractant containing the sodium thiomolybdenum species from the sulfidized aqueous solution containing sodium thiotungsten values,
  (e) stripping molybdenum values from the separated organic extractant by contacting said organic extractant with an aqueous solution containing sufficient amount of oxidizing agent suitable for oxidizing said molybdenum values to molybdate ion, and
  (f) recycling said extracted solution to step (c) to extract further molybdenum values.

* * * * *